US 7,054,886 B2

(12) United States Patent
Stern et al.

(10) Patent No.: US 7,054,886 B2
(45) Date of Patent: May 30, 2006

(54) METHOD FOR MAINTAINING PEOPLE AND ORGANIZATION INFORMATION

(75) Inventors: Jonathan Stern, Newton, MA (US); Jeremy W. Rothman-Shore, Cambridge, MA (US); Kosmas Karadimitriou, Shrewsbury, MA (US); Michel Decary, Montreal (CA)

(73) Assignee: Zoom Information, Inc., Waltham, MA (US)

( * ) Notice: Subject to any disclaimer, the term of this patent is extended or adjusted under 35 U.S.C. 154(b) by 548 days.

(21) Appl. No.: 09/917,200

(22) Filed: Jul. 27, 2001

(65) Prior Publication Data

US 2002/0059251 A1 May 16, 2002

Related U.S. Application Data

(60) Provisional application No. 60/221,750, filed on Jul. 31, 2000.

(51) Int. Cl.
*G06F 17/00* (2006.01)
(52) U.S. Cl. .................... 707/104.1; 707/100
(58) Field of Classification Search ............... 707/1–10, 707/200–206, 100–104.1; 705/1, 500; 709/201–203
See application file for complete search history.

(56) References Cited

U.S. PATENT DOCUMENTS

| | | | |
|---|---|---|---|
| 4,270,182 A | 5/1981 | Asija | |
| 5,319,777 A | 6/1994 | Perez | |
| 5,764,906 A | 6/1998 | Edelstein et al. | |
| 5,813,006 A * | 9/1998 | Polnerow et al. | ............. 707/10 |
| 5,835,905 A | 11/1998 | Pirolli et al. | |

(Continued)

FOREIGN PATENT DOCUMENTS

AU      A-53031/98      8/1998

(Continued)

OTHER PUBLICATIONS

ABCNEWS.com, Apr. 28, 1999. http://web.archive.org/web/19990428185649/abcnews.go.com/.

(Continued)

*Primary Examiner*—Jean M. Corrielus
*Assistant Examiner*—Joon Hwan Hwang
(74) *Attorney, Agent, or Firm*—Hamilton, Brook, Smith & Reynolds, P.C.

(57) ABSTRACT

A database is formed and maintained by computer-automated means extracting information from a global computer network. The database contains information about people and organizations. The present invention method provides continual updates to the information stored in the database by the people named in the database and by the automated means. Integrity of the automatically extracted information is maintained. A link from the invention database to a third party data system provides updates in the information in the database to be communicated to the third party data system for updating and maintaining data of the third party data system. The database may serve as an email communication clearinghouse where senders do not need to know the email address of a person named in the database but rather leaves messages through that person's record in the database. Targeted advertising to a named person is provided during his accessing the database. The targeted advertising is based on information about the named person as stored in the database. The database may be queried by any combination of person name, job title, organization name and field of business of the organization. The invention method provides clipping service which monitors changes in the information stored in the database and notifies interested parties of detected changes.

17 Claims, 4 Drawing Sheets

U.S. PATENT DOCUMENTS

| | | | |
|---|---|---|---|
| 5,895,470 | A | 4/1999 | Pirolli et al. |
| 5,918,236 | A | 6/1999 | Wical |
| 5,923,850 | A | 7/1999 | Barroux |
| 5,924,090 | A | 7/1999 | Krellenstein |
| 6,052,693 | A | 4/2000 | Smith et al. |
| 6,065,016 | A * | 5/2000 | Stuntebeck et al. ......... 707/200 |
| 6,076,088 | A | 6/2000 | Paik et al. |
| 6,094,653 | A | 7/2000 | Li et al. |
| 6,112,203 | A | 8/2000 | Bharat et al. |
| 6,122,647 | A | 9/2000 | Horowitz et al. |
| 6,128,613 | A | 10/2000 | Wong et al. |
| 6,212,552 | B1 | 4/2001 | Biliris et al. |
| 6,253,198 | B1 | 6/2001 | Perkins |
| 6,260,033 | B1 | 7/2001 | Tatsuoka |
| 6,266,664 | B1 | 7/2001 | Russell-Falla et al. |
| 6,269,369 | B1 * | 7/2001 | Robertson .................... 707/10 |
| 6,301,614 | B1 | 10/2001 | Najork et al. |
| 6,314,409 | B1 * | 11/2001 | Schneck et al. .............. 705/54 |
| 6,336,108 | B1 | 1/2002 | Thiesson et al. |
| 6,336,139 | B1 | 1/2002 | Feridun |
| 6,349,309 | B1 | 2/2002 | Aggarwal et al. |
| 6,377,936 | B1 | 4/2002 | Henrick et al. |
| 6,389,436 | B1 | 5/2002 | Chakrabarti et al. |
| 6,418,432 | B1 | 7/2002 | Cohen et al. |
| 6,463,430 | B1 * | 10/2002 | Brady et al. ................... 707/3 |
| 6,466,940 | B1 * | 10/2002 | Mills .......................... 707/102 |
| 6,493,703 | B1 | 12/2002 | Knight et al. |
| 6,529,891 | B1 | 3/2003 | Heckerman |
| 6,553,364 | B1 | 4/2003 | Wu |
| 6,556,964 | B1 | 4/2003 | Haug et al. |
| 6,601,026 | B1 | 7/2003 | Appelt et al. |
| 6,618,717 | B1 | 9/2003 | Karadimitriou et al. |
| 6,640,224 | B1 | 10/2003 | Chakrabarti |
| 6,654,768 | B1 * | 11/2003 | Celik ....................... 707/104.1 |
| 6,668,256 | B1 | 12/2003 | Lynch |
| 6,675,162 | B1 | 1/2004 | Russell-Falla et al. |
| 6,697,793 | B1 | 2/2004 | McGreevy |
| 6,745,161 | B1 | 6/2004 | Arnold et al. |
| 6,859,797 | B1 | 2/2005 | Skopicki |
| 2001/0009017 | A1 | 7/2001 | Biliris et al. |
| 2003/0221163 | A1 | 11/2003 | Glover et al. |
| 2003/0225763 | A1 | 12/2003 | Guilak et al. |

FOREIGN PATENT DOCUMENTS

| | | |
|---|---|---|
| AU | A 53031/98 | 8/1998 |
| AU | A-53031-98 | 8/1998 |
| JP | 10-320315 | 12/1998 |
| WO | WO 99/67728 | 12/1999 |

OTHER PUBLICATIONS

COMPAQ, Apr. 22, 1999. http://web/archive.org/web/19990422222242/www.compaq.com/.

Dwi H. Widyantoro, Thomas R. Ioerger, John Yen. "An Adaptive Algorithm for Learning Changes in User Interests". Nov. 1999. ACM. p. 405-412.

Soumen Chakrabarti, Byron Dom, Piotr Indyk. "Enhanced hypertext categorization using hyperlinks". 1998 ACM. pp. 307-318.

Sahami, M. et al., "SONIA: A Service for Organizing Networked Information Autonomously," *3rd ACM Conference on Digital Libraries, Digital 98 Libraries*, Jun. 23-26, 1998, pp. 200-209.

Nir Friedman, Moises Goldszmidt, "Building Classifiers using Bayesian Networks". From Proceedings of the National Conference on Artificial Intelligence (AAAI96) . pp. 1277-1284.

Pazzani, M. et al., "Learning from hotlists and coldlists: Towards a WWW information filtering and seeking agent," *Proc. International Conference on Tools with Artificial Intelligence*, Los Alamitos, CA 1994, pp. 492-495.

Lam, W. and K. Low, "Automatic Document Classification Based on Probabilistic Reasoning: Model and Perfomance Analysis," *1996 IEEE Conference on Computational Cybernetics and Simulation*, Orlando, FL 1997, pp. 2719-2723.

PCT International Search Report PCT/US01/22385, Dec. 18, 2002, (4 pp).

PCT International Search Report PCT/US01/22430, Jan. 12, 2003, 4 pp.

PCT International Search Report PCT/US01/22381, Feb. 12, 2003, 3 pp.

Ball, T. and F. Douglis, "An Internet Difference Engine and its Applications," *Proceeedings of COMPCON '96, IEEE Comp. Soc. Press*, Feb. 25, 1996, pp. 71-76.

Freitag, D., "Machine learning for Information Extraction in Informal Domains," *Machine Learning* 39:2/3 (169-202), May/Jun. 2000, p. 169-202.

Kjell, B., "Authorship Attribution of Text Samples Using Neural Networks and Bayesian Classifiers," *IEEE Int. Conf. on Systems, Man, and Cybernetics*, vol. 2, Oct. 5, 1994, pp. 1660-1664.

Singhal, M., "Update Transport: A New Technique for Update Synchronization in Replicated Database Systems,"*IEEE Transactions on Software Engineering* 16:12 (1325-1336), Dec. 1, 1990.

PCT International Search Report PCT/US01/41515, Feb. 28, 2003, 4 pp.

Langer, A. and J.S. Rosenschein, "Using Distributed Problem Solving to Search the Web," *Proc. 4th Int. Conf. on Autonomous Agents, ACM, USA*, Jun. 3-7, 2000, pp. 197-198

Miller, M., "The Complete Idiot's Guide to Online Search Secrets," *Que*, 2000, pp. 172-179.

PCT International Search Report PCT/US01/24162.

Lorrie Faith Cranor and Brian A. LaMacchia, "Spam!" Communications of the ACM, Aug. 1998. vol. 4, No. 8, pp. 74-83.

PCT International Search Report PCT/US01/22425.

A.K. Jain et al. "Data Clustering: A Review." ACM Computing Surveys, vol. 31, No. 3, Sep. 1999, pp. 264-323.

Hall, Robert J. "How to Avoid Unwanted Email." Communications of the ACM, Mar. 1998. vol. 41, No. 3, pp. 88-95.

* cited by examiner

US 7,054,886 B2

METHOD FOR MAINTAINING PEOPLE AND ORGANIZATION INFORMATION

RELATED APPLICATIONS

This application claims the benefit of U.S. Provisional Application No. 60/221,750, filed on Jul. 31, 2000, the entire teachings of which are incorporated herein by reference. This application also relates to U.S. patent application Ser. No. 09/704,080, filed Nov. 1, 2000, now U.S. Pat. No. 6,618,717; U.S. patent application Ser. No. 09/703,907, filed Nov. 1, 2000, now U.S. Pat No. 6,778,986; U.S. Pat. No. 6,778,986; U.S. patent application Ser. No. 09/768,869 filed Jan. 24, 2001, U.S. patent pending non-final application Ser. No. 09/821,908 filed Mar. 30, 2001, now U.S. Pat. No. 6,983,682; and U.S. patent application Ser. No. 09/910,169, filed Jul. 20, 2001, entitled Computer Method and Apparatus for Extracting pending non-final Data from Web Pages, U.S. application Ser No. 09/910,069, all by the Assignee of the present invention and herein incorporated by reference.

BACKGROUND OF THE INVENTION

Generally speaking a global computer network, e.g., the Internet, is formed of a plurality of computers coupled to a communication line for communicating with each other. Each computer is referred to as a network node. Some nodes serve as information bearing sites while other nodes provide connectivity between end users and the information bearing sites.

The explosive growth of the Internet makes it an essential component of every business, organization and institution strategy, and leads to massive amounts of information being placed in the public domain for people to read and explore. The type of information available ranges from information about companies and their products, services, activities, people and partners, to information about conferences, seminars, and exhibitions, to news sites, to information about universities, schools, colleges, museums and hospitals, to information about government organizations, their purpose, activities and people. The Internet became the venue of choice for every organization for providing pertinent, detailed and timely information about themselves, their cause, services and activities.

The Internet essentially is nothing more than the network infrastructure that connects geographically dispersed computer systems. Every such computer system may contain publicly available (shareable) data that are available to users connected to this network. However, until the early 1990's there was no uniform way or standard conventions for accessing this data. The users had to use a variety of techniques to connect to remote computers (e.g. telnet, ftp, etc) using passwords that were usually site-specific, and they had to know the exact directory and file name that contained the information they were looking for.

The World Wide Web (WWW or simply Web) was created in an effort to simplify and facilitate access to publicly available information from computer systems connected to the Internet. A set of conventions and standards were developed that enabled users to access every Web site (computer system connected to the Web) in the same uniform way, without the need to use special passwords or techniques. In addition, Web browsers became available that let users navigate easily through Web sites by simply clicking hyperlinks (words or sentences connected to some Web resource).

Today the Web contains more than one billion pages that are interconnected with each other and reside in computers all over the world (thus the term "World Wide Web"). The sheer size and explosive growth of the Web has created the need for tools and methods that can automatically search, index, access, extract and recombine information and knowledge that is publicly available from Web resources.

The following definitions are used herein.

Web Domain

Web domain is an Internet address that provides connection to a Web server (a computer system connected to the Internet that allows remote access to some of its contents).

URL

URL stands for Uniform Resource Locator. Generally, URLs have three parts: the first part describes the protocol used to access the content pointed to by the URL, the second contains the directory in which the content is located, and the third contains the file that stores the content:

Commonly, the <protocol> part may be missing. In that case, modern Web browsers access the URL as if the http://prefix was used. In addition, the <file> part may be missing. In that case, the convention calls for the file "index.html" to be fetched.

Web Page

Web page is the content associated with a URL. In its simplest form, this content is static text, which is stored into a text file indicated by the URL. However, very often the content contains multi-media elements (e.g. images, audio, video, etc) as well as non-static text or other elements (e.g. news tickers, frames, scripts, streaming graphics, etc). Very often, more than one files form a Web page, however, there is only one file that is associated with the URL and which initiates or guides the Web page generation.

Web Browser

Web browser is a software program that allows users to access the content stored in Web sites. Modem Web browsers can also create content "on the fly", according to instructions received from a Web site. This concept is commonly referred to as "dynamic page generation". In addition, browsers can commonly send information back to the Web site, thus enabling two-way communication of the user and the Web site.

As our society's infrastructure becomes increasingly dependent on computers and information systems, electronic media and computer networks progressively replace traditional means of storing and disseminating information. There are several reasons for this trend, including cost of physical vs. computer storage, relatively easy protection of digital information from natural disasters and wear, almost instantaneous transmission of digital data to multiple recipients, and, perhaps most importantly, unprecedented capabilities for indexing, search and retrieval of digital information with very little human intervention.

Decades of active research in the Computer Science field of Information Retrieval have yield several algorithms and techniques for efficiently searching and retrieving information from structured databases. However, the world's largest information repository, the Web, contains mostly unstructured information, in the form of Web pages, text documents, or multimedia files. There are no standards on the content, format, or style of information published in the Web, except perhaps, the requirement that it should be understandable by human readers. Therefore the power of structured database queries that can readily connect, combine and filter information to present exactly what the user wants is not available in the Web.

Trying to alleviate this situation, search engines that index millions of Web pages based on keywords have been developed. Some of these search engines have a user-friendly front end that accepts natural languages queries. In general, these queries are analyzed to extract the keywords the user is possibly looking for, and then a simple keyword-based search is performed through the engine's indexes. However, this essentially corresponds to querying one field only in a database and it lacks the multi-field queries that are typical on any database system. The result is that Web queries cannot become very specific; therefore they tend to return thousands of results of which only a few may be relevant. Furthermore, the "results" returned are not specific data, similar to what database queries typically return; instead, they are lists of Web pages, which may or may not contain the requested answer.

In order to leverage the information retrieval power and search sophistication of database systems, the information needs to be structured, so that it can be stored in database format. Since the Web contains mostly unstructured information, methods and techniques are needed to extract data and discover patterns in the Web in order to transform the unstructured information into structured data.

The Web is a vast repository of information and data that grows continuously. Information traditionally published in other media (e.g. manuals, brochures, magazines, books, newspapers, etc.) is now increasingly published either exclusively on the Web, or in two versions, one of which is distributed through the Web. In addition, older information and content from traditional media is now routinely transferred into electronic format to be made available in the Web, e.g. old books from libraries, journals from professional associations, etc. As a result, the Web becomes gradually the primary source of information in our society, with other sources (e.g. books, journals, etc) assuming a secondary role.

As the Web becomes the world's largest information repository, many types of public information about people become accessible through the Web. For example, club and association memberships, employment information, even biographical information can be found in organization Web sites, company Web sites, or news Web sites. Furthermore, many individuals create personal Web sites where they publish themselves all kinds of personal information not available from any other source (e.g. resume, hobbies, interests, "personal news", etc).

In addition, people often use public forums to exchange e-mails, participate in discussions, ask questions, or provide answers. E-mail discussions from these forums are routinely stored in archives that are publicly available through the Web; these archives are great sources of information about people's interests, expertise, hobbies, professional affiliations, etc.

Employment and biographical information is an invaluable asset for employment agencies and hiring managers who constantly search for qualified professionals to fill job openings. Data about people's interests, hobbies and shopping preferences are priceless for market research and target advertisement campaigns. Finally, any current information about people (e.g. current employment, contact information, etc) is of great interest to individuals who want to search for or reestablish contact with old friends, acquaintances or colleagues.

As organizations increase their Web presence through their own Web sites or press releases that are published on-line, most public information about organizations become accessible through the Web. Any type of organization information that a few years ago would only be published in brochures, news articles, trade show presentations, or direct mail to customers and consumers, now is also routinely published to the organization's Web site where it is readily accessible by anyone with an Internet connection and a Web browser. The information that organizations typically publish in their Web sites include the following:
  Organization name
  Organization description
  Products
  Management team
  Contact information
  Organization press releases
  Product reviews, awards, etc
  Organization location(s)
. . . etc . . .

SUMMARY OF THE INVENTION

Using the methods described in related U.S. Provisional Application No. 60/221,750, filed on Jul. 31, 2000, for "Computer Database Method and Apparatus", and related U.S. patent application Ser. No. 09/704,080, filed Nov. 1, 2000; U.S. patent application Ser. No. 09/703,907, filed Nov. 1, 2000; U.S. patent application Ser. No. 09/768,869 filed Jan. 24, 2001; U.S. patent application Ser. No. 09/821,908 filed Mar. 30, 2001; and U.S. patent application Ser. No. 09/910,169, filed Jul. 20, 2001 entitled Computer Method and Apparatus for Extracting Data from Web Pages by Michel Decary, Jonathan Stern, Kosmas Karadimitriou and Jeremy Rothman-Shore (all by the Assignee of the present invention and herein incorporated by reference), it is possible to automatically build a large database of information about people and organizations found on Web pages of the Web. In one embodiment, the database includes the following information:

People Information
First name, middle name, last name
Name prefix (Mr., Dr., . . . ), name suffix (Jr., Sr., II, . . . )
Employment data (current employer, title, responsibilities, organization location)
Previous positions (dates, titles, organizations, start and end date, organization location)
Educational data (degrees, schools, concentration, graduation date)
Contact information (phone, address, email, FAX)
Accreditation (CPA, RN, LCSW, . . . )
Complete text of sentences and lines that the data was extracted from
. . . etc . . .
Organizations information
Organization name
Organization Web site URL
Organization description
Keywords about the organization
Contact information for company headquarters and additional offices (phone, address, fax)
Organization email addresses (sales@ . . . com, support@ . . . com, etc.)
Organization subsidiaries
Organization partners
Organization competitors
Number of employees
. . . etc . . .

In addition to these data, the text content of the retrieved Web pages is also stored in the database. The purpose is to keep a "cached" version of each page so that it can be used for debugging purposes, it can be re-processed by data extraction tools if new types of data need to be retrieved or if the tools themselves are improved, and to be able to present the original version of the page to users who want to see where the data came from.

The database of information about people and organizations described in the above-cited related patent applications has a very high business value since it contains a data collection unparalleled in size and timeliness of updates (i.e., is maintained up-to-date). In general, revenue may be created in five ways:

a) provide users with paid access to the data either through a subscription scheme or by selling query results b) provide users free access to the database, but create revenue by displaying advertising targeted to the specific user based on the information about them already contained in the database c) provide users with means to communicate with people they find in the database, mainly via email messages d) maintain information in other people's databases by connecting it to this database and generating update transactions into their database e) provide a clipping services for people or companies about new references to them on the internet.

In the preferred embodiment, the present invention provides a method for storing or managing information about people and/or organizations. The method steps include using automated means, extracting from a global computer network information about individual people, and storing the extracted information in a database, the database including for each person a respective record holding at least name of the person and name of a respective current employer; and enabling people named in the database to access respective records, said enabling access being in a manner that enables each respective person to edit the data in his record of the database such that the database is maintained and continually updated by the person named in the database and by the automated means.

The step of enabling access includes maintaining integrity of the automatically extracted and stored information.

The method may further comprise the steps of:

linking from a desired record in the database to a third party data system, said linking providing a communication link;

updating the data in the desired record linked to the third party data system; and using the communication link, notifying the third party data system of the updated data in the desired record such that the third party data system employs the updated data in maintaining data of the third party data system.

In accordance with one aspect of the present invention, the database may be utilized as an e-mail communication clearinghouse system to each person named in the database. The e-mail communication clearinghouse system enables a sender to send a message to a person named in the database based on name of the person absent an email address for the named person. That is, the database does not show to others the email addresses of people, but instead uses the individual database records as the connection between a sender and recipient.

The present invention further enables targeted advertising to a person named in the database during his accessing of his record. The targeted advertising is based on information stored in the respective record.

In accordance with another aspect of the invention, for each person, the respective record further indicates job title of the person. The invention method further comprises the step of querying the data base by name and job title. In addition, the invention method, using the automated means, extracts from a global computer network, information about organizations, and stores the extracted organization information in the database. The database includes for each organization, name of the organization and field of business of the organization. To that end the step of querying includes querying the database by organization name and field.

According to another aspect, the invention method provides computer means for monitoring changes in information about desired people or organizations. In response to the monitoring step detecting a change, the computer means notifies an interested (predefined) party of said detected change.

The method may further comprise the step of enabling individuals to annotate, including updating, information stored in the database. This step is accomplished in a manner that maintains integrity of the information as automatically extracted.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 4:
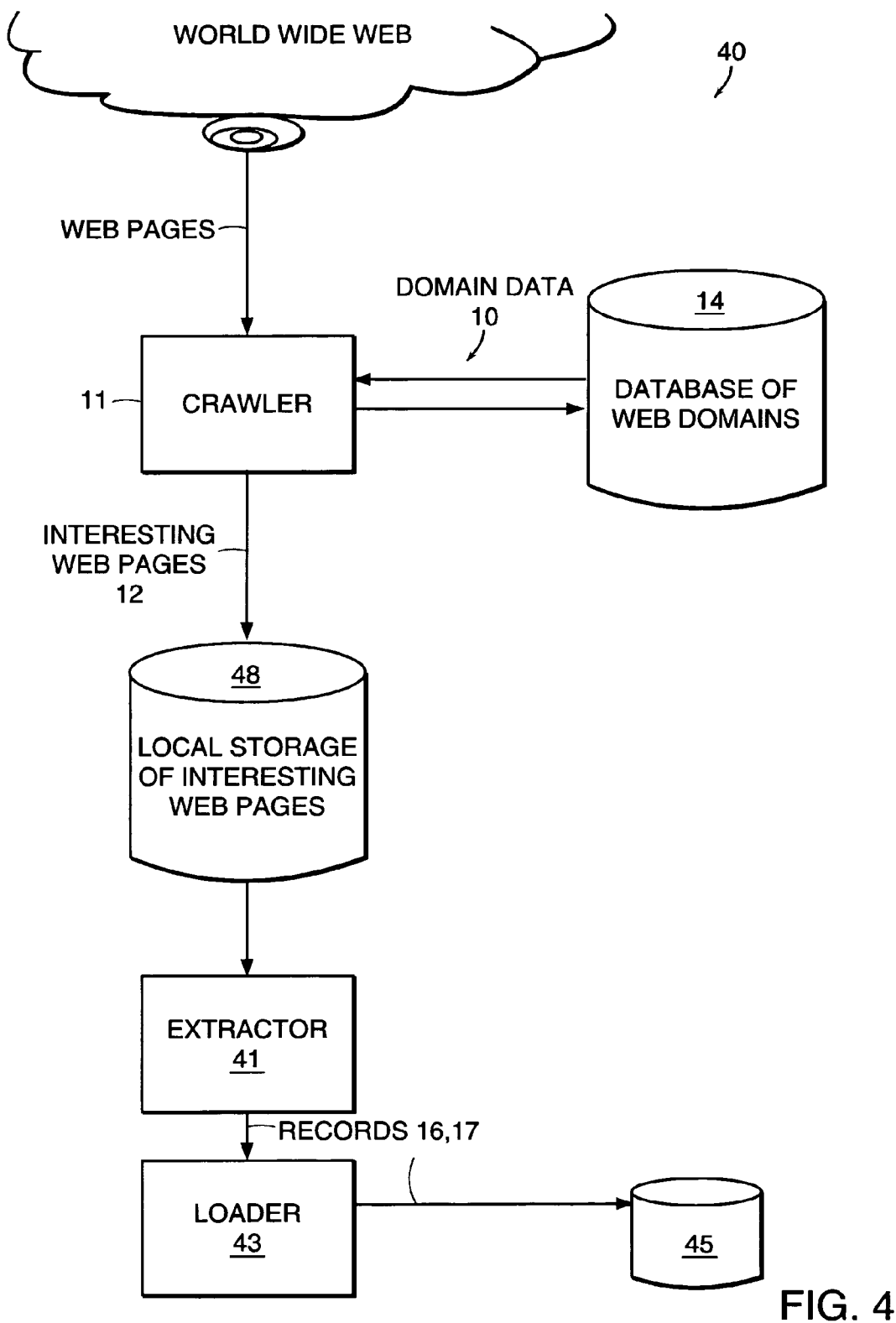
FIG. 4 is a schematic view of a computer system for providing and maintaining a database of the present invention.

With reference to FIG. 4, a computer system 40 for producing and maintaining the database of information about people and organizations in the present invention is composed of the following three major components:

The Crawler 11

The component referred to as "Crawler" 11 is a software robot that "crawls" the Web visiting and traversing Web sites with the goal of identifying and retrieving pages 12 with relevant and interesting information.

The Extractor 41

The "Extractor" 41 is the component that performs data extraction on the pages 12 retrieved by the Crawler 11. This data extraction in general is based on Natural Language Processing techniques and uses a variety of rules to identify and extract the relevant and interesting pieces of information.

The Loader 43

Data produced by the extractor 41 are saved into a database 45 by the "Loader" 43. This component 43 also performs many post-processing tasks to clean-up and refine the data before storing information in database 45. These tasks include duplicate removal, resolving of aliases, correlating data produced from different Web sites, filtering and/or combining information, etc.

In the preferred embodiment, the Crawler 11 is a version of the software robot described in U.S. patent application Ser. No. 09/821,908 filed on Mar. 30, 2001 for a "Computer Method and Apparatus for Collecting People and Organization Information from Web Sites" and assigned to the assignee of the present invention. As input, Crawler 11 receives domain data 10 from a working database 14 of Web domains of possible interest. Using the domain data 10, Crawler 11 accesses a Web site and processes it as follows. Specific rules are used to identify pages that contain organization information or relevant people information (e.g. name, employment, contact info, etc). For example, pages with a street address of the organization, press release pages, product list pages, pages that contain information about the management team, employee directory, etc. All the interesting pages 12 that the Crawler 11 collects are then passed (through a local storage 48) to the Extractor 41 for further processing and data extraction.

The role of the Extractor 41 is to extract information about people and/or organizations from a single Web page. For people, the extractor 41 has to find all mentions of a person, identify information related to people and associate it with the right person. For organizations, the extractor 41 must identify all occurrences of organization names, identify information related to the organizations and recognize descriptive paragraphs of texts related to an organization. Extractor 41 places extracted information into working records 16 (for people), 17 (for organizations) that lead to the creation of database 45.

The loader 43 is responsive to the working records 16, 17 produced by Extractor 41. In the preferred embodiment, loader 43 identifies whether two records 16 relate to the same person at the same current position or whether two records 17 relate to the same organization. In addition, it is very common in a language to use different words and abbreviations that basically mean the same thing. In order for the loader 43 to properly identify people and organizations and to collect all relevant data about them, it is necessary to identify and resolve all such aliases, a process called aliasing resolution. The loader 43 accomplishes detection/deletion of effectively duplicate records 16, 17 and aliasing resolution of people names, organization names and titles.

A preferred embodiment of Extractor 41 and Loader 43 is described in U.S. patent application Ser. No. 09/910,169, filed Jul. 20, 2001 entitled "Computer Method and Apparatus for Extracting Data from Web Pages", by Michel Decary, Jonathan Stem, Kosmas Karadimitriou and Jeremy Rothman-Shore, herein incorporated by reference.

The resulting database 45 holds non-duplicating records 16, 17 whose contents include information about people and/or organizations. The database production and maintenance system 40 continually operates as described above to reap updated information as well as new people/organization information. System 40 further maintains existing database records 16,17 with the updated information along with creating new records 16, 17 as appropriate.

Figure 1:
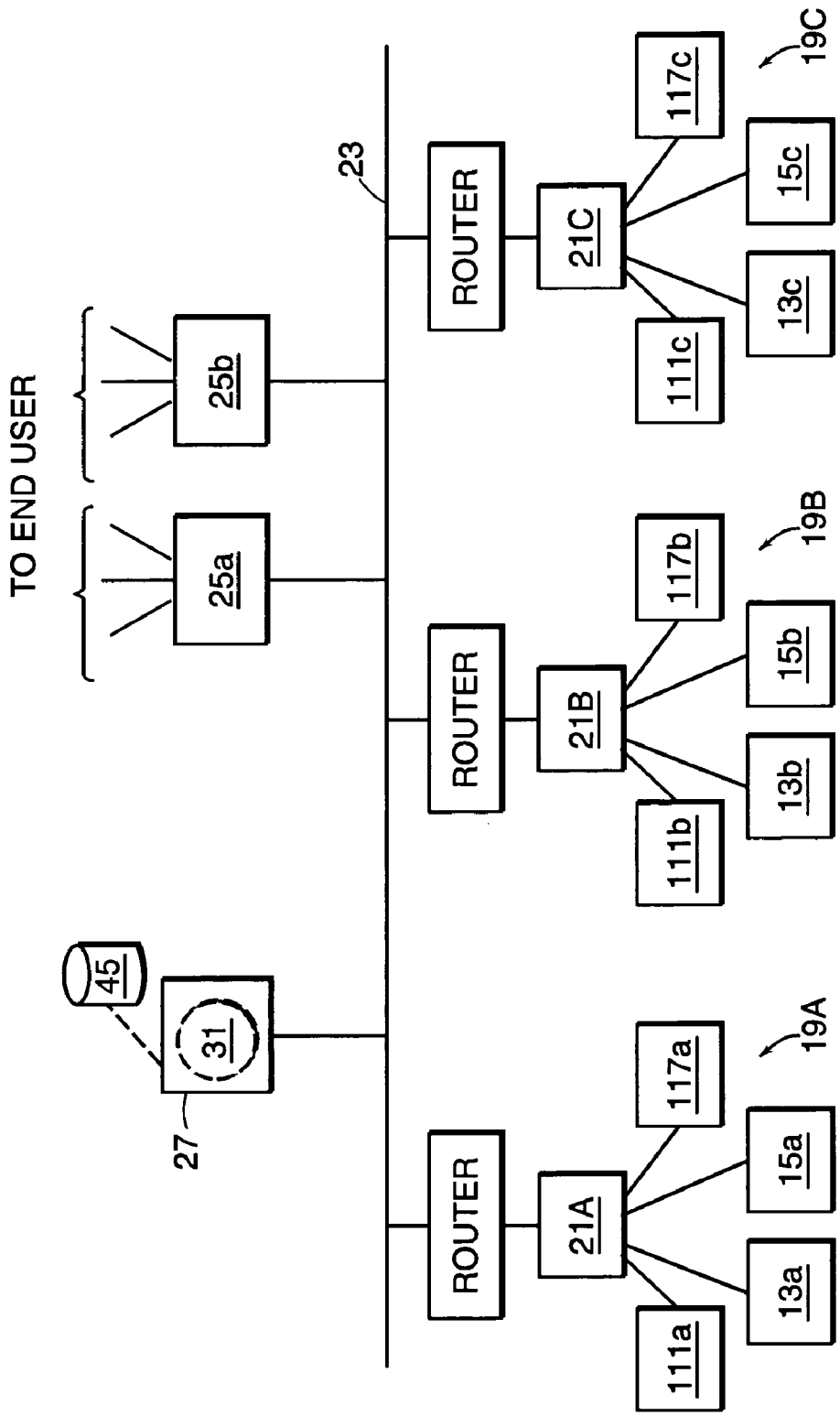
FIG. 1 is a schematic overview of a computer network in which the present invention is operated.

Database 45 and the working applications program 31 of the present invention are hosted on a Network server 27 as follows. Illustrated in FIG. 1 is a plurality of networks 19a, 19b, 19c. Each network 19 includes a multiplicity of digital processors 111, 13, 15, 117 (e.g., PC's, mini computer and the like) loosely coupled to a host processor or server 21a, 21b, 21c for communication among the processors within that network 19. Also included in each network 19 are printers, facsimiles and the like. In turn, each host processor 21 is coupled to a communication line 23 which interconnects or links the networks 19a, 19b, 19c to each other to form an internet. That is, each of the networks 19 are themselves loosely coupled along a communication line 23 to enable access from a digital processor 111, 13, 15, 117 of one network 19 to a digital processor 111, 13, 15, 117 of another network 19. In the preferred embodiment, the loose coupling of networks 19 is the Internet.

Also linked to communication line 23 are various servers 25a, 25b which provide to end users access to the Internet (i.e., access to potentially all other networks 19, and hence processors 111, 13, 15, 117 connected to the Internet). The present invention is a software program 31, with supporting database 45, operated and connected through a server 27 to the Internet for communication among the various networks 19 and/or processors 111, 13, 15, 117 and other end user connected through respective servers 25. In the preferred embodiment, the server 27 is, for example, Sun Microsystems UltraSparc (e.g., Enterprise series), or a multiplicity of similar such servers running HyperText Transfer protocol (HTTP) server software to support operation of present invention program 31.

It is understood that invention program 31 and database 45 may be stored on (reside on) one or a multiplicity of computers in a distributed or other processing system architecture.

Figure 2:
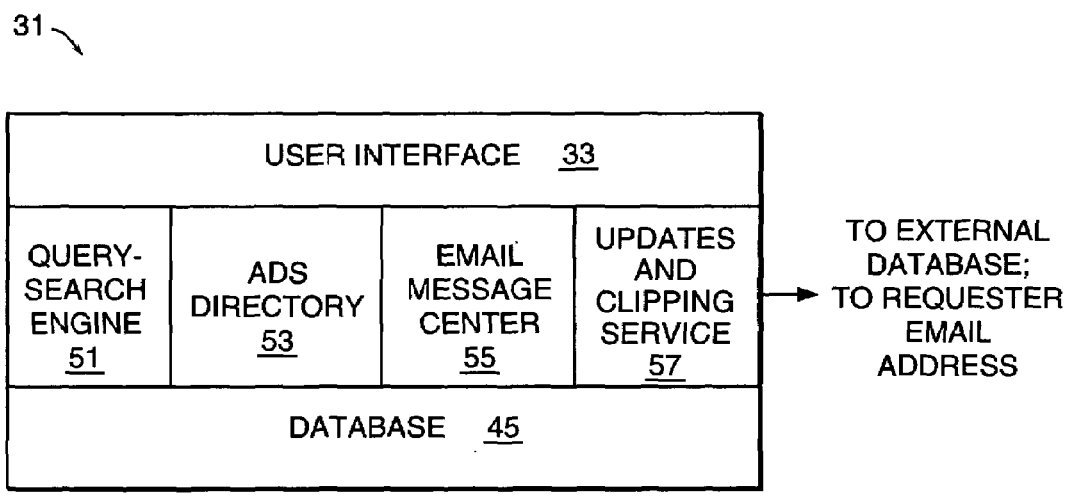
FIG. 2 is a block diagram of a preferred embodiment of the present invention.

In a preferred embodiment, program 31 has functional components or modules which utilize database 45 as illustrated in FIG. 2. Included are a query-search engine 51, an advertisement director 53, an email center 55 and an updating/clipping servicer 57 (each described further below). Each module 51, 53, 55, 57 receives input from and produces output to end users through a user interface 33. Known (common) browser technology and the HTTP protocol or the like are employed by user interface 33. The modules 51, 53, 55, 57 access and use the database 45 contents for respective purposes as described next.

With regard to query-search engine module 51, the extraction and organization of Web data into a relational database (such as database 45) offers unique advantages over regular Web search engines. The data can be queried and combined in very complex ways using standard relational database queries, producing aggregate results and data combinations unprecedented in power and sophistication. For example, queries like the following are possible:

"Find the name and contact information of all persons who are working or have worked in the past as Sales Managers in pharmaceutical companies and have an MBA degree from Harvard University".

"Find the Web site URL of all companies that produce photographic equipment in Arizona and have released at least 10 press releases in the last 9 months".

"Find all companies that employ people with a degree in physics and are located in California".

This ability to formulate such general questions and receive specific answers is incredibly valuable to users, and it is a service that many people will be willing to pay for. One possible payment structure for a service like this is a subscription model, where a user pays a fixed amount of money for access to the system for a fixed period of time. A second possible payment structure is on a per-query basis, where a user pays for each query that he executes.

Accordingly, in one embodiment database 45 is a relational database and query-search engine module 51 is a relational database query engine (as known in the art). It is understood that other types of architectures and corresponding query-search engines are suitable.

With regard to advertising director module 53, the information about people in the database may be used to generate advertising of specific interest to that person. For example, ads may be selected for a user based on the following fields of database records 16, 17, among others:

Keywords in occupation title (e.g. marketing, programmer, president)

Company location (e.g. Massachusetts, Los Angeles)

Company Description (e.g. manufacturing, consulting)

Etc.

Thus, a software engineer is presented with software product ads, a person residing in Baltimore sees ads about Baltimore restaurants, a business executive is presented with business magazine ads, etc.

Figure 3:
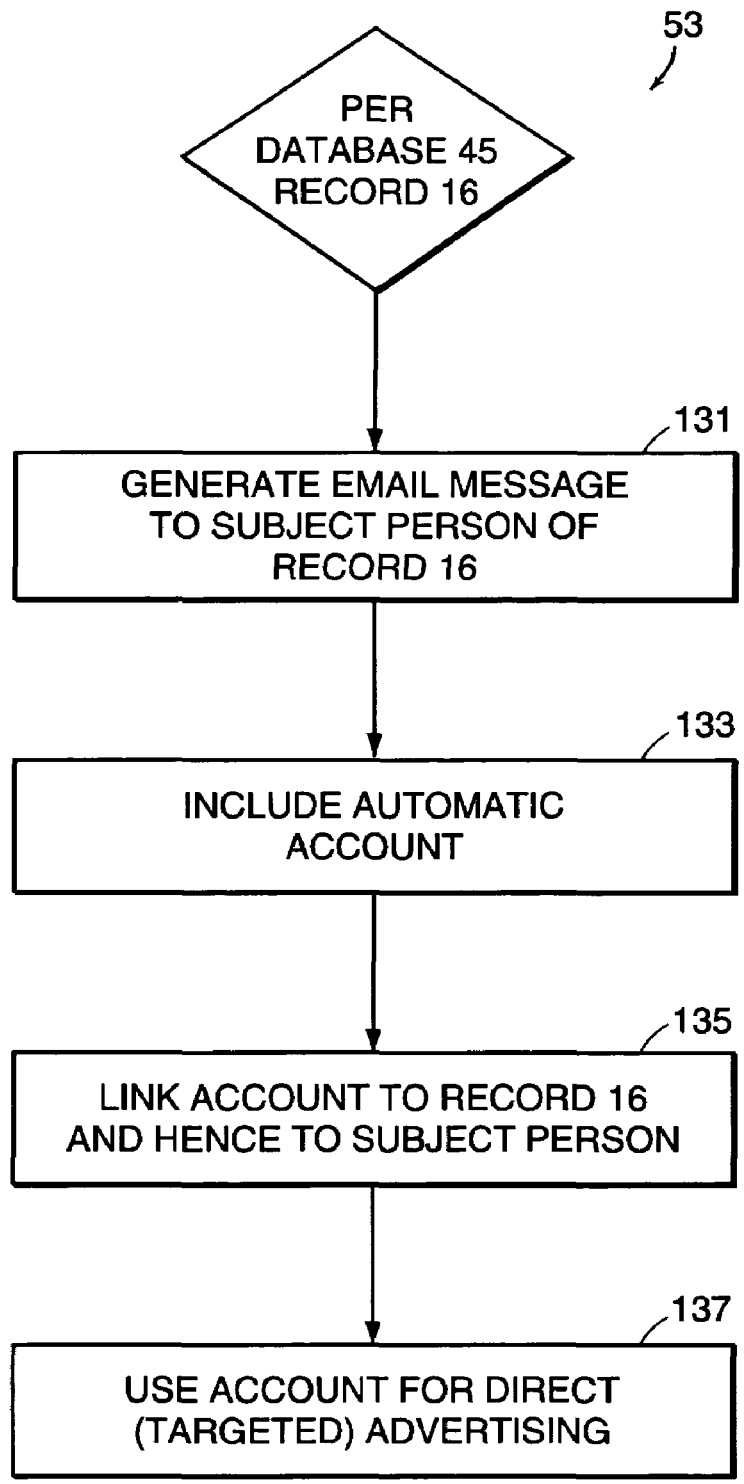
FIG. 3 is a flow diagram of the module for directing advertisement in the embodiment of FIG. 2.

In order to implement such targeting of advertisements based on the various information about people and companies stored in database 45, there needs to be a way to know whether a user accessing the system/program 31 has a record 16, 17 in the database 45 and, more importantly, which record 16, 17 it is. FIG. 3 illustrates a preferred method of making this determination as described next.

U.S. patent application Ser. No. 09/918,312, filed Jul. 30, 2001 entitled "Data Mining System" by Jonathan Stern, Jeremy Rothman-Shore, Kosmas Karadimitriou and Michel Decary and assigned to the Assignee of the present invention, describes a system for emailing to a person with a corresponding database record 16, a message as a process for verifying interpolated email addresses during post-processing. For the email verification to work, the actual text of the email message is not relevant; the verification routine just needs to search for/check for unknown recipient messages from other email servers.

So for a given database record 16 corresponding to a person, step 131, (FIG. 3) generates an email message that introduces the subject person to the services (modules) of program 31 and offers him free access to the system 31, 45. The generated email message includes an automatically generated account (step 133) for the subject person to use when accessing the system 31, 45. Since this account is generated by the system 31 when the email address was interpolated and verification message sent, it is connected with the subject person's record 16 (step 135), and thus used for directed advertising purposes (step 137).

In addition to inviting the user to simply use the system 31, 45, users may be prompted to review and correct any mistakes or missing information in their respective record 16. This updated data is used to augment the original information, and both sets of data reside in the database 45 simultaneously. Thus, queries (e.g., from module 51) might search the updated information, when it is available, or the original information, or both. When database production and maintenance system 40 extracts new data from the Web, system 40 replaces the old extracted data, but the user-edited data will remain.

Prompting the users to edit their information may bring people to the host website 27 who would not be interested in using it for searching. Thus program 31 provides an email clearinghouse, i.e. email message center module 55, as one of a variety of uses of database 45.

Many users will want to communicate with people who have corresponding records 16 in the database 45, either for business reasons (they think that they have a product of interest, for example) or for personal reasons (perhaps they went to the same school and want to get in touch). However, providing users with the email addresses of people named in the database 45 may raise concerns about privacy and bulk junk email (spam).

The email message center module 55 provides a "black box" email (clearinghouse) system, where a user may send a message to another user having a corresponding database record 16 in the database 45 without ever seeing the recipient user s email address. The sender simply selects the record 16 of the person they want to contact (program 31 hides the email field data of that record 16), writes a message using a text editor or similar commonly known text tool integrated into program 31, and asks the email message center module 55/program system 31 to deliver the message. Program 31 uses the email address stored in the record 16 or otherwise generates/produces the subject recipient person's email address and forwards/relays the sender-generated message via common email system techniques and protocol.

In one embodiment, the recipient users are able to customize how they receive messages from email center 55 so that they do not feel like they are receiving junk email. For example, they may choose to receive messages as they come, or they receive digests on a daily, weekly, or monthly basis. Furthermore, they may choose not to receive any notification at all, but simply visit host site 27 to collect the messages from respective database records 16.

Revenue would come from the users sending the emails. They would pay a fixed fee for each email, with perhaps different rates for business topics and personal topics.

Turning now to the updates and clipping service module 57, many groups and organizations already maintain their own databases of information about people and companies. These databases are built manually, and because people are constantly moving and switching jobs, they require constant updating by hand.

These external databases may be connected to the invention system 31, 45 to update the external database contents/information. Once the two databases (invention database 45 and external database) are able to communicate with each other, the Integrator system described in U.S. patent application Ser. No. 09/918,312, filed Jul. 30, 2001 entitled "Data Mining System" by Jonathan Stem, Jeremy Rothman-Shore, Kosmas Karadimitriou and Michel Decary may be used to associate or correspond individual records 16, 17 in the invention database 45 to individual records in the external database.

Whenever the information in the external database record differs from that of the corresponding record 16 in database 45, update module 57 generates an update transaction. For example, if the external database record indicates that a person works for company A, and the corresponding record 16 in database 45 indicates that the same person works for company B but notes that the subject person worked for company A in the past, then update module 57 generates an update transaction. That is, following (or compatible with) the conventions of the external database system, update module 57 communicates to the external database system that the subject external database record needs updating and transmits a copy of the up-to-date information from corresponding record 16 of database 45 as illustrated in FIG. 2. In response, the external database system replaces the contents of the subject external database record with the newly received information from invention database 45 via update module 57.

Revenue would come on a per-transaction basis, where the owners of the external database would pay for each update transaction generated. In a similar manner, update module 57 may serve as a "clipping service" that monitors and notifies interested parties of changes in information about people and/or organizations as stored by database 45.

Since the database production and maintenance system 40 (FIG. 4) is continuously crawling the Web, it may find information about a certain person or organization in various sites. Furthermore, it may also detect new Web pages with such references, especially in news sites. This is a very important capability that is commercially exploitable in the form of a "clipping service". Users can subscribe to the clipping service (module 57) so that they are notified when new Web pages are found that refer to them. The subscribing user in this case specifies the email address that module 57 is to send notification. The system 31 module 57 lets the subscribing users choose when to receive such notification, e.g. as soon as a new page with reference to their name is detected, or in a summarized monthly email, etc. In addition, subscribing users may choose to receive notifications for any name or organization, and also may choose the type of Web pages that the system 31/module 57 should report, e.g. a user may want to see all news articles that contain reference to "Alan Greenspan", or all new organization Web pages that refer to "Corex Technologies Corp".

In one embodiment, update and clipping service module 57 maintains a working table of names to watch for (as requested by users) and an indication of respective email address to send notification to if database production and maintenance system 40 finds new information concerning such name. The indication of email address may be a pointer or similar link to a record 16, 17 (e.g., address field thereof) in database 45 or recite directly the email address of the subscribing user. The working table also indicates subscribing user preference of frequency of notification and desired types of Web pages to be reported. As database production and maintenance system 40 adds new records 16, 17 to and updates records 16, 17 in database 45, update and clipping service module 57 compares names contained in the new information from system 40 with the names listed in the working table. If module 57 finds a match, then module 57 notifies the requesting/subscribing user accordingly as noted in the working table (frequency-wise and Web page type-wise).

In another embodiment, for each name of interest (to be watched) requested by a subscribing user, update and clipping service module 57 searches database 45 for corresponding records 16, 17. If no corresponding database records 16, 17 are found, then update and clipping service module 57 creates a new respective database record 16, 17 containing the requested name (to be watched). Next update and clipping service module 57 maintains a date and time stamped flag in each record 16, 17 (prior existing or newly created) corresponding to names to watch for as requested by subscribing users. The flag also links email address of requesting/subscribing user, indication of preferred frequency and indication of Web page type desired. As database production and maintenance system 40 updates a record 16, 17 whose flag has been set, update and clipping service module 57 notifies the requesting/subscribing user accordingly.

It is understood that other implementations in addition to or instead of the above-described working table and flag are suitable for the clipping services of update and clipping service module 57.

While this invention has been particularly shown and described with references to preferred embodiments thereof, it will be understood by those skilled in the art that various changes in form and details may be made therein without departing from the scope of the invention encompassed by the appended claims.

For example, in the above description of the invention and preferred embodiments, the term "the Web" may more generally refer to any global network of computers and the like.

It is understood that database production and maintenance system 40 is a digital processor (computer) system having the above-described functions 11, 41, 43 implemented in hardware, software or a combination thereof. Said digital processor system may be a plurality of computers operated in parallel, distributed or other fashion for carrying out the functions of the crawler 11, extractor 41 and loader 43 as described in conjunction with FIG. 4.

Likewise, program modules 51, 53, 55, 57 are software, hardware or a combination run on a digital processor (computer) 27.

What is claimed is:

1. A method of providing a data store of people information, comprising the steps of:

using automated means, extracting from a global computer network unstructured information about individual people, and storing the extracted information in a database, the database including for each person a respective record holding at least name of a person and name of a respective current employer; and enabling people named in the database to access respective records, said enabling access being in a manner that enables each respective person to edit data in each respective person's record of the database but maintains integrity of the automatically extracted information such that both user-edited data and automatically extracted information reside simultaneously in the database, the user-edited data being maintained and continually updated by a person named in the database and automatically extracted information being maintained by the automated means and not the person such that integrity of the automatically extracted and stored information is maintained, the automated means replacing old extracted data but not user-edited data with newly extracted data, portions of the user-edited data being same information but a different version of the automatically extracted information.

2. A method as claimed in claim 1 further comprising the steps of:

linking from a desired record in the database to a third party data system, said linking providing a communication link;

updating data in the desired record linked to the third party data system; and using the communication link, notifying the third party data system of the updated data in the desired record such that the third party data system employs the updated data in maintaining data of the third party data system.

3. A method as claimed in claim 1 further comprising the step of utilizing the database as an e-mail communication system to each person named in the database, the e-mail communication system enabling a sender to send a message to a named person based on name of a person absent the sender having an email address for the named person.

4. A method as claimed in claim 1 further comprising the step of targeted advertising to a named person during access of his record, the targeted advertising being based on information stored in a record.

5. A method as claimed in claim 1 wherein for each person, the respective record further holds job title of the person; and
   further comprising the step of querying the data base by name and job title.

6. A method as claimed in claim 1 further comprising the steps of:
   using the automated means, extracting from a global computer network, information about organizations, and storing the extracted organization information in the database, the database including for each organization, name of an organization and field of business of the organization; and
   querying the database by organization name and field.

7. A method as claimed in claim 6 further comprising:
   providing computer means for monitoring changes in information about desired people or organizations; and
   in response to said monitoring detecting a change, notifying an interested party of said detected change.

8. A method for e-mail communication comprising the steps of:
   providing a database storing information regarding people, said providing including using crawler means, automatically extracting unstructured information regarding people and/or organizations from sites on a global computer network and storing the extracted information in the database, such that the database is formed by automated means;
   coupling an e-mail clearinghouse system to the database, in a manner that enables each person named in the database to receive e-mail in a respective e-mail box, in a manner free of the database indicating email addresses of people named in the database to email message senders; and
   enabling individuals to annotate, including updating, information stored in the database in a manner that maintains integrity of the information as extracted, such that both user-edited data and automatically extracted information reside simultaneously in the database, the user-edited data being maintained by a respective individual and the automatically extracted information being maintained by the automated means and not the respective individual and thus maintaining integrity, the automated means replacing old extracted data but not user-edited data with newly extracted data, portions of the user-edited data being same information but a different version of the automatically extracted information.

9. A method as claimed in claim 8 wherein the database stores extracted information in respective records, a different record for each different person and organization, and further comprising the steps of:
   linking from a desired record in the database to a third party data system, said linking providing a communication link;
   updating data in the desired record linked to the third party data system; and
   using the communication link, notifying the third party data system of the updated data in the desired record such that the third party data system employs the updated data in maintaining data of the third party data system.

10. A method as claimed in claim 9 wherein the step of updating is computer automated and regularly occurring.

11. A method as claimed in claim 8 further comprising:
   providing computer means for monitoring changes in information about desired people or organizations, and in response to said monitoring detecting a change, notifying a predetermined party of said detected change.

12. A method as claimed in claim 8 further comprising the steps of:
   enabling access to the database by people named in the extracted information stored in the database; and
   targeting advertising to a person named in the database during his accessing the database, the targeted advertising being based on the extracted information stored in the database.

13. A method for obtaining information about people or organizations comprising the computer-implemented steps of:
   extracting from a global computer network unstructured information about individual people and organizations;
   storing the extracted information in a database;
   monitoring the global computer network for changes in information about desired people or organizations with respect to the extracted information stored in the database; and
   in response to said monitoring (i) detecting a change in information about at least one person, (ii) notifying an interested party of said detected change and (iii) from the global computer network as monitored, corresponding new information about the desired people or organizations to the extracted information stored in the database, (iv) replacing old extracted information but not user-edited data stored in the database with the new information, wherein the interested party includes the at least one person and new information about the at least one person is corresponded to extracted information about the at least one person stored in the database.

14. A method as claimed in claim 13 further comprising the steps of:
   linking from certain information stored in the database to a third party data system, said linking providing a communication link;
   updating the certain information in the database; and
   using the communication link, notifying the third party data system of the updated information such that the third party data system employs the updated information in maintaining data of the third party data system.

15. A method as claimed in claim 13 further comprising the step of utilizing the database as an email communication system to each person named in the information stored in the database, the email communication system enabling a sender to send a message to a named person based on name of a person absent the sender having an email address for the named person.

16. A method as claimed in claim 13 further comprising the steps of:
   enabling people named in the information stored in the database to access the database; and
   advertising to a named person during his accessing the database, the advertising being targeted based on information stored in the database.

17. A method as claimed in claim 13 wherein the step of storing the extracted information includes for each person, storing indications of name and job title of a person, and for each organization, storing indications of organization name and field of business of the organization; and
   further comprising the step of querying the database by any combination of person name, job title, organization name and field of business.

* * * * *